United States Patent [19]

Kobayashi et al.

[11] 3,959,205

[45] May 25, 1976

[54] PREPARATION OF AQUEOUS EMULSION

[75] Inventors: Koichi Kobayashi; Akihito Kimura, both of Ibaraki, Japan

[73] Assignee: Nippon Gohsei Kagaku Kogyo Kabushiki Kaisha, Osaka, Japan

[22] Filed: Sept. 3, 1974

[21] Appl. No.: 502,357

[30] Foreign Application Priority Data
Jan. 19, 1973 Japan.................. 48-9050

[52] U.S. Cl.............. 260/29.6 RW; 260/29.6 WB; 260/29.7 RP; 260/29.7 W
[51] Int. Cl.².......................................... C08L 9/10
[58] Field of Search........... 260/29.6 RB, 29.6 RW, 260/29.7 W, 29.7 UP, 29.7 UA, 29.7 WA, 29.6 WA, 79.3 R, 79.3 MU, 29.6 WB, 29.7 RP

[56] References Cited
UNITED STATES PATENTS

| | | | |
|---|---|---|---|
| 2,386,764 | 10/1945 | Zwicker | 260/29.7 WA |
| 2,395,347 | 2/1946 | Sharkey | 260/79.3 R |
| 2,834,759 | 5/1958 | Austin | 260/79.3 MU |
| 2,859,191 | 11/1958 | Turnbull | 260/79.3 MU |
| 3,318,830 | 5/1967 | Condon | 260/79.3 MU |
| 3,320,199 | 5/1967 | Brezinski | 260/79.3 MU |
| 3,755,236 | 8/1973 | Puskas | 260/79.3 MU |

Primary Examiner—Paul R. Michl
Attorney, Agent, or Firm—Armstrong, Nikaido & Wegner

[57] ABSTRACT

Stable aqueous emulsions of acrylate polymers, methacrylate polymers or butadiene polymers, which are prepared by emulsion polymerization in the presence of hydrolyzed vinyl acetate-alkali metal olefinsulfonate copolymer as an emulsifier.

The aqueous emulsions thus prepared have excellent properties in storage stability, viscosity stability, dilution stability, freeze-thaw stability and miscibility with pigment or urea resin. The emulsion can also give a film excellent in water-resistance.

4 Claims, No Drawings

PREPARATION OF AQUEOUS EMULSION

BACKGROUND OF THE INVENTION

The present invention relates to the preparation of an aqueous emulsion of acrylate polymers, methacrylate polymers or butadiene polymers by employing hydrolyzed vinyl acetate-alkali metal olefinsulfonate copolymer as an emulsifier.

In an emulsion polymerization it has been known to polymerize monomers in the presence of emulsifier and initiator in an aqueous medium, and also been known that the emulsifier used in the polymerization remarkably has a great influence on the properties of emulsion. Polyvinyl alcohol (hereinafter referred to as PVA) is one of the most popular emulsifier for emulsion polymerization of vinyl acetate and vinyl chloride, but it is not effective for acrylic esters, methacrylic esters or butadiene. As an emulsifier in emulsion polymerization of acrylic esters, methacrylic esters or butadienes, noionic or anionic surface active agents have been usually employed.

An emulsion obtained by such a method is useful for an adhesive, a coating material or a textile treating agent, but has poor characteristics in storage stability, viscosity stability, freeze-thaw stability and dilution stability. Therefore, the greatest care has to be paid in handling such emulsions.

OBJECTS OF THE INVENTION

It is an object of the present invention to provide a stable aqueous emulsion of acrylate polymers, methacrylate polymers or butadiene polymers.

A further object of the invention is to provide an emulsion excellent in storage stability, freeze-thaw stability, viscosity stability, dilution stability and miscibility with pigment or urea resin and also in water-resistance of a film formed therefrom.

A still further object of the invention is to provide a process for preparing the above-mentioned aqueous emulsion.

These and other objects of the invention will become apparent from the description hereinafter.

DETAILED DESCRIPTION

It has now been found that the above-mentioned objects can be attained by employing a modified PVA as an emulsifier in an emulsion polymerization, namely a hydrolyzed vinyl acetate-alkali metal olefinsulfonate copolymer having a molecular weight of 4,000 to 150,000 and of which alkali metal olefinsulfonate content is within the range of 0.5 to 7% by mole and a degree of hydrolysis in vinyl acetate unit is at least 65% by mole. The emulsion obtained in accordance with the present invention is superior in storage stability, miscibility with pigment or urea resin, freeze-thaw stability, viscosity stability, dilution stability and water-resistance of a film formed therefrom, to a conventional one.

Such remarkable effects are obtained only when the specific modified PVA, namely a partially or completely hydrolyzed vinyl acetate-alkali metal olefinsulfonate copolymer containing 0.5 to 7% by mole of alkali metal olefinsulfonate unit, is employed as an emulsifier in an emulsion polymerization instead of surface active agents. According to the present invention, the modified PVA containing less than 0.5% by mole of alkali metal olefinsulfonate is substantially similar to a non-modified PVA, namely PVA per se. On the other hand, when the alkali metal olefinsulfonate content is more than 7% by mole, it is difficult to obtain a stable emulsion since a distribution of polymer particle size becomes broad, or water-resistance of a film formed from the emulsion drops. In the present invention, it is essential to employ the modified PVA containing the alkali metal olefinsulfonate unit within the range of 0.5 to 7% by mole, preferably within the range of 1 to 3% by mole.

Furthermore, when the modified PVA having the lower molecular weight than the before-mentioned is employed, a large quantity of macro-grains are produced or the storage stability at high temperature and freeze-thaw stability become poor and, therefore, it is difficult to obtain a practical emulsion. On the other hand, when the modified PVA having the higher molecular weight is employed, the viscosity of the emulsion increases and then the emulsion may coagulate.

The partially or completely hydrolyzed vinyl acetate-alkali metal olefinsulfonate copolymer is prepared by copolymerizing vinyl acetate monomer and an alkali metal salt of olefinsulfonic acid monomer with a polymerization initiator in the absence of a solvent or in the presence of an alcohol, usually at a temperature of 60° to 65°C., and then partially or completely hydrolyzing the resulting copolymer in a conventional manner. In the polymerization, the monomers are introduced into a polymerization vessel by an arbitrary method, for instance, both monomers are introduced at once and then the polymerization is effected, or alkali metal olefinsulfonate monomer is continuously or intermittently introduced in the course of polymerizing vinyl acetate.

Examples of the alkali metal olefinsulfonate are alkali metal salts of olefinsulfonic acid such as ethylenesulfonic acid, allylsulfonic acid and 2-methylallylsulfonic acid. As an alkali metal, litium, sodium and potassium are suitable. Especially sodium salts of olefinsulfonic acid are preferably employed in the present invention.

As a polymerization initiator, known radical polymerization initiators such as azobisisobutyronitrile, acetyl peroxide, benzoyl peroxide, lauroyl peroxide, and the like, are employed.

When the polymerization is carried out in the presence of the alcohol, it is preferable to employ a lower alkyl alcohol in an amount of not more than 40% by weight of the total weight of the polymerization system. Examples of the lower alkyl alcohol are those having 1 to 4 carbon atoms such as methanol, ethanol, propanol, and butanol. According to the present invention, such alcohol solvents may contain water not more than 25% by weight per alcohols. The employment of a solvent other than alcohols make the molecular weight of the obtained modified PVA lower, and as a result, it is difficult to obtain a practical emulsion as stated before.

The copolymerized vinyl acetate-alkali metal olefinsulfonate copolymer is partially or completely hydrolyzed in the presence of an acid or an alkali in a conventional manner. In the present invention, the copolymer hydrolyzed to the extent of at least 65% by mole in the vinyl acetate unit, preferably at least 80% by mole, are employed as an emulsifier. The modified PVA having a degree of hydrolyzation of not more than 65% by mole cannot provide the stable aqueous emulsion as mentioned above.

The aqeuous emulsions in the present invention are limited to specific polymers, i.e. acrylate polymers, methacrylate polymers or butadiene polymers.

Examples of the acrylates and methacrylates in the present invention are methyl ester, ethyl ester, propyl ester, butyl ester, 2-ethylhexyl ester, 2-hydroxyethyl ester, glycidyl ester, and the like, of acrylic acid or methacrylic acid. Examples of the butadiene monomers are butadiene-1,3,2-methylbutadiene-1,3, 2,3-dimethylbutadiene-1,3 2-chlorobutadiene-1,3, and the like. These monomers are employed alone or in a mixture thereof, and also employed in combination with another copolymerizable monomer such as styrene, acrylonitrile, acrylic acid, methacrylic acid, vinyl acetate, acrylic amide or N-methylolacrylic amide, in an amount of not more than 50% by mole in the total amount of the monomers. Examples of the preferable combination of the above monomers are butyl acrylate and styrene, butyl acrylate and 2-ethylhexyl acrylate, butyl acrylate and vinyl acetate, butyl acrylate and methyl methacrylate, butyl acrylate and acrylic acid, butadiene-1,3 and styrene, butadiene-1,3 and styrene and acrylic acid, butadiene-1,3 and styrene and methacrylic acid, butadiene-1,3 and acrylonitrile, butadiene-1,3 and acrylonitrile and styrene, butadiene-1,3 and acrylonitrile and acrylic acid, butadiene-1,3 and acrylonitrile and methacrylic acid, butadiene-1,3 and methyl methacrylate, butadiene-1,3 and methyl methacrylate and acrylic acid, and butadiene-1,3 and methyl methacrylate and methacrylic acid. In case of preparing an emulsion of butadiene copolymers, monomers are suitably employed so as to give a copolymer containing 50 to 90% by mole of butadiene unit, preferably 55 to 80% by mole of butadiene unit in the copolymer.

In the process for emulsion-polymerizing these specific monomers, any conventional method can be employed except that the modified PVA above-mentioned is employed as an emulsifier.

The amount of the modified PVA, namely hydrolyzed vinyl acetate-alkali metal olefinsulfonate copolymer, varies to some extent in compliance with the degree of modification of the modified PVA or the desired polymer content of the obtained emulsion. Usually the amount is selected from the range of 0.5 to 15% by weight per the monomer employed.

The emulsion polymerization is usually carried out in an aqueous medium in an amount of 40 to 65% by weight per the monomer at a temperature of 35° to 90°C. with agitation.

Examples of the polymerization initiator are known water-soluble initiators such as potassium persulfate or ammonium persulfate, known redox polymerization initiators such as potassium persulfate-sodium hydrogensulfite, ammonium persulfate-sodium hydrogensulfite, hydrogen peroxide-tartaric acid, hydrogen peroxide-iron salt, hydrogen peroxide-ascorbic acid-iron salt, hydrogen peroxide-formaldehyde sodium sulfoxylate dihydrate, hydrogen peroxide-formaldehyde sodium sulfoxylate dihydrate-irom salt, and the like.

According to the present invention, the modified PVA may also be employed in combination with a nonionic surface active agent such as polyoxyethylene-alkyl ethers, polyoxyethylene-alkyl phenols or polyhydric esters, or an anionic surface active agent such as higher alcohol sulfates. Further, a plasticizer such as phthalates or phosphates, or a pH controlling agent such as sodium carbonate, sodium acetate or sodium phosphate may also be employed in the emulsion polymerization.

Thus prepared emulsions are very stable. Particularly in the case of aqueous emulsions of homopolymer or copolymer of acrylic or methacrylic esters, the present invention bears remarkable effects.

In general, the emulsion prepared in accordance with the present invention has a solid content of 30 to 60% by weight, a viscosity of 10 to 10,000 cps. and a structural viscosity index of 0.05 to 1.0. Also, the particle size of polymer in the emulsion is within the range of 50 to 250 m$\mu$.

To the emulsion prepared in accordance with the present invention, if desired, may be added not more than 10% by weight per solid content in aqueous emulsion of a water-soluble polymeric material such as PVA or carboxymethyl cellulose, or an alkali such as ammonia or sodium carbonate to increse the viscosity of the emulsion.

The instant emulsions are availably employed as an adhesive, coating material, textile treating agent or paper treating agent.

The present invention is more particularly described and explained by means of the following illustrative Examples, in which all parts and % are parts by weight and % by weight unless otherwise stated.

EXAMPLE 1 AND CONTROL 1

A 1,000 ml. glass polymerization vessel equipped with a reflux condenser, a dropping funnel, a thermometer and a stirrer was charged with 320 parts of vinyl acetate, 130 parts of methanol, 15 parts of 30% aqueous solution of sodium ethylenesulfonate and 0.2% by mole of azobisisobutylonitrile per the vinyl acetate. After carrying out the polymerization at a temperature of 60° to 65°C. for 8 hours, the residual vinyl acetate was removed by a conventional method to give vinyl acetate-sodium ethylenesulfonate copolymer containing 2.3% by mole of sodium ethylenesulfonate unit. Then the copolymer was hydrolyzed by a conventional method to give a modified PVA of which degree of hydrolysis in vinyl acetate unit was 99% by mole.

A 500 ml. glass polymerization vessel equipped with a reflux condenser, a dropping funnel, a thermometer and a stirrer was charged with 138.4 g. of 3.9% aqueous solution of the modified PVA and 9 g. of 9% aqueous solution of sodium secondary phosphate as a pH controlling agent, and the temperature was elevated to 65°C. with agitation at the rate of 200 r.p.m. Then the vessel was charged with 11 g. of butyl acrylate and 10 g. of 4% aqueous solution of potassium persulfate and emulsion polymerization was initiated. After the initial polymerization for 35 minutes, the polymerization was carried out for 4 hours at 70°C. During the polymerization, 98.1 g. of butyl acrylate was continuously added dropwise for 4 hours and 3.5 g. of 4% aqueous solution of potassium persulfate was added in two portions. Thereafter, the polymerization was further continued for 1 hour with maintaining the temperature of 75°C. to complete the polymerization, and then the residual monomer was removed to give an emulsion of polybutyl acrylate.

As Control 1, the same procedure as in Example 1 was repeated except that a combination of 2.7 g. of PVA of which degree of hydrolysis was 99% by mole, 2.7 g. of nonionic surface active agent (commercially available under the trademark "NIssan Nonion P-230" made by Nippon Oils and Fats Co., Ltd.) and 18.0 g. of anionic surface active agent (commercially available under the trademark "Nissan Trax" made by Nippon Oils and Fats Co., Ltd.) was employed as an emulsifier instead of the modified PVA.

The results were shown in Table 1.

The results were shown in Table 2, in which the viscosity was measured at 30°C. by a rotation viscometer (4 r.p.m.).

Table 1

| | Polymer content | pH | Average particle size | Dilution stability | | Miscibility with urea resin | | Water resistance of film | Storage stability at high temp. | Freeze-thaw stability |
|---|---|---|---|---|---|---|---|---|---|---|
| | | | | upper layer | under layer | method I | method II | | | |
| | % | — | μ | mm. | | — | | % | — | — |
| Example 1 | 42.0 | 3.8 | 0.12 | 2 | 1 | A | A | 0.9 | A | A |
| Control 1 | 42.2 | 4.0 | 0.27 | 5 | 3 | B | C | 2.1 | C | C |

NOTE:
1. Dilution stability is indicated by each depth of supernatant layer (upper layer) and precipitated portion (under layer) of a diluted emulsion in a glass tube having an inner diameter of 7 mm. and length of 1 m. when an emulsion is diluted to 3 % in polymer content with distilled water and is placed in the glass tube which is then sealed, and allowed to stand for 24 hours at room temperature.
2. Miscibility with urea resin is evaluated by two method as follows:
Method I: 20 g. of an emulsion and 20 g. of urea resin are placed in a beaker and immediately agitated with a glass bar. After allowing to stand for 6 hours, about 2 g. of the mixture is spread over a glass plate. It is evaluated in three ranks, "excellent" (A), "good" (B) and "passable" (C) as to whether the mixture flows evenly and smoothly on the glass plate.
Method II: 20 g. of an emulsion and 20 g. of urea resin are placed in a beaker and immediately agitated with a glass bar. Further, 2 g. of ammonium chloride is added to the beaker as a hardener and is agitated. After allowing to stand for 10 minutes, about 2 g. of the mixture is spread over a glass plate. The evaluation is effected in the same manner as Method I.
3. Water resistance of film shows the ratio of elution of a film into water calculated from weight change before and after putting the film into water, in which the film (250 mμ in thickness) formed from an emulsion is heat-treated at a temperature of 100° C. for 20 minutes and then put into water at a temperature of 30°C. for 24 hours.
4. Storage stability at high temperature is evaluated by appearance of an emulsion when about 50 g. of an emulsion is allowed to stand at a temperature of 60°C. for 5 days, and then cooled for 3 hours. A, B and C show "excellent", "good" and "passable", respectively.
5. Freeze-thaw stability is evaluated by appearance of an emulsion when about 50 g. of an emulsion is allowed to stand at a temperature of −15°C. for 16 hours and further restored in a constant temperature bath at 30°C. for one hour and then agitated, in which A, B and C show "excellent", "good"and "passable", respectively.

Table 2

| | Hydrolyzed vinyl acetate-sodium ethylenesulfonate copolymer | | | Polymer content | pH | Viscosity |
|---|---|---|---|---|---|---|
| | *methanol : monomer by weight | sodium ethylenesulfonate content % by mole | degree of hydrolysis in vinyl acetate unit % by mole | % | — | cps |
| Example 2 | 5 : 95 | 1.7 | 99.0 | 42.0 | 4.0 | 1,080 |
| Example 3 | 10 : 90 | 2.4 | 88.0 | 42.1 | 3.9 | 4,670 |
| Example 4 | 25 : 75 | 3.0 | 99.0 | 42.2 | 3.9 | 890 |
| Example 5 | 30 : 70 | 2.4 | 89.1 | 41.8 | 3.8 | 3,150 |
| Example 6 | 90 : 10 | 2.0 | 98.1 | 41.1 | 3.1 | 250 |
| Control 2 | 50 : 50 | 0.3 | 99.2 | 42.3 | 3.8 | — |
| Control 3 | 40 : 60 | 9.0 | 99.3 | 41.7 | 3.7 | 540 |

*"Methanol : monomer" shows the ratio of methanol and monomer in the polymerization for preparing the modified PVA.

| | Dilution stability | | Miscibility with urea resin | | Water resistance of film | Storage stability at high temp. | Freeze-thaw stability |
|---|---|---|---|---|---|---|---|
| | upper layer | under layer | method I | method II | | | |
| | mm. | | — | | % | — | — |
| Example 2 | 3 | 1 | A | A | 0.8 | A | A |
| Example 3 | 2 | 1 | A | A | 0.6 | A | A |
| Example 4 | 3 | 1 | A | A | 1.1 | A | A |
| Example 5 | 2 | 1 | A | A | 0.8 | A | A |
| Example 6 | 3 | 1 | B | C | 1.4 | B | B |
| Control 2* | — | — | — | — | — | — | — |
| Control 3 | 5 | 1 | C | C | 2.6 | C | B |

*Stable emulsion was not obtained.

EXAMPLES 2 TO 6 AND CONTROLS 2 TO 3

The same procedures as in Example 1 were repeated except that various modified PVA as shown in Table 2 were employed instead of one employed in Example 1.

EXAMPLES 7 TO 13

The same procedures as in Example 1 were repeated except that various acrylic monomers as shown in Table 3 were employed instead of butyl acrylate.

The results were shown in Table 3.

Table 3

| | Monomer | | Polymer content | pH | Viscosity |
|---|---|---|---|---|---|
| | Kind | Amount | | | |
| | — | g. | % | — | cps |
| Example 7 | Ethyl acrylate | 108 | 42.0 | 4.6 | 1,110 |
| Example 8 | Butyl acrylate Styrene | 154 54 | 41.2 | 4.7 | 880 |
| Example 9 | Butyl acrylate 2-ethylhexyl acrylate | 76 32 | 42.1 | 4.3 | 705 |
| Example 10 | Butyl acrylate Vinyl acetate | 76 32 | 40.9 | 4.2 | 325 |
| Example 11 | Methyl methacrylate Acrylonitrile | 97 11 | 43.0 | 4.6 | 970 |
| Example 12 | Butyl acrylate | 54 | 41.8 | 4.8 | 1,020 |

Table 3-continued

|  |  |  |  |  |  |
|---|---|---|---|---|---|
| Example 13 | Methyl methacrylate<br>Butyl acrylate<br>Acrylic acid | 54<br>108<br>5.7 | 42.9 | 4.5 | 970 |

| | Dilution stability | | Miscibility with urea resin | | Water resistance of film | Storage stability at high temp. | Freeze-thaw stability |
|---|---|---|---|---|---|---|---|
| | upper layer | under layer | method I | method II | | | |
| | mm. | | — | | % | — | — |
| Example 7 | 2 | 1 | A | A | 0.9 | A | A |
| Example 8 | 2 | 1 | A | A | 0.8 | A | A |
| Example 9 | 3 | 1 | A | A | 0.9 | A | B |
| Example 10 | 2 | 1 | A | A | 0.8 | A | A |
| Example 11 | 2 | 1 | A | A | 0.7 | A | A |
| Example 12 | 2 | 1 | A | A | 0.8 | A | A |
| Example 13 | 2 | 1 | A | A | 1.0 | A | A |

EXAMPLE 14

A 1,000 ml. glass polymerization vessel equipped with a reflux condenser, a dropping funnel, a thermometer and a stirrer was charged with 395 parts of vinyl acetate, 186 parts of methanol, 27 parts of sodium allylsulfonate and 0.23% by mole per the vinyl acetate of azobisisobutylonitrile. After carrying out the polymerization at a temperature of 60° to 65°C. for 8 hours, the residual vinyl acetate was removed by a conventional method to give vinyl acetate-sodium allylsulfonate copolymer containing 3.0% by mole of sodium allylsulfonate unit. Then the copolymer was hydrolyzed by a conventional method to give a modified PVA of which degree of hydrolysis in vinyl acetate unit was 99% by mole.

A 500 ml. glass polymerization vessel equipped with a reflux condenser, a dropping funnel, a thermometer and a stirrer was charged with 138.4 g. of 3.9% aqueous solution of the modified PVA and 9 g. of 9% aqueous solution of sodium secondary phosphate as a pH controlling agent, and the temperature was elevated to 65°C. with agitation at a rate of 200 r.p.m. Then 11 g. of butyl acrylate and 10 g. of 4% aqueous solution of potassium persulfate were added to the vessel to initiate the emulsion polymerization and the initial polymerization was carried out for 35 minutes. Further the polymerization was continued at a temperature of 70°C. for 4 hours with adding dropwise 98.1 g. of butyl acrylate continuously for 4 hours and also with adding 3.5 g. of 4% aqueous solution of potassium persulfate in two portions. Successively, the polymerization was continued at a temperature of 75°C. for 1 hour to complete the polymerization, and then the residual monomer was removed to give an emulsion of polybutyl acrylate.

The results were shown in Table 4.

Table 4

| | Polymer content | pH | Average particle size | Dilution stability | | Miscibility with urea resin | | Water resistance of film | Storage stability at high temp. | Freeze-thaw stability |
|---|---|---|---|---|---|---|---|---|---|---|
| | | | | upper layer | under layer | method I | method II | | | |
| | % | — | μ | mm. | | — | | % | — | — |
| Example 14 | 41.6 | 3.8 | 0.16 | 2 | 1 | A | A | 0.8 | A | B |

EXAMPLES 15 TO 18 AND CONTROLS 4 TO 5

The same procedures as in Example 14 were repeated except that various modified PVA as shown in Table 5 were employed instead of one employed in Example 14.

The results were shown in Table 5.

Table 5

| | Hydrolyzed vinyl acetate-sodium ethylenesulfonate copolymer | | | Polymer content | pH | Viscosity |
|---|---|---|---|---|---|---|
| | *methanol : monomer by weight | sodium ethylenesulfonate content % by mole | degree of hydrolysis in vinyl acetate unit % by mole | % | — | cps |
| Example 15 | 5 : 95 | 1.7 | 99.0 | 42.0 | 4.0 | 200 |
| Example 16 | 10 : 90 | 2.4 | 99.0 | 42.1 | 3.9 | 150 |
| Example 17 | 25 : 75 | 1.0 | 99.0 | 42.2 | 3.9 | 70 |
| Example 18 | 30 : 70 | 1.5 | 99.0 | 41.8 | 3.8 | 60 |
| Control 4 | 90 : 10 | 9.0 | 98.1 | 41.1 | 5.1 | 50 |
| Control 5 | 50 : 50 | 0.3 | 99.2 | 42.3 | 3.8 | 60 |

*"Methanol : monomer" shows the ratio of methanol and monomer in the polymerization for preparing the modified PVA.

| | Dilution stability | | Miscibility with urea resin | | Water resistance of film | Storage stability at high temp. | Freeze-thaw stability |
|---|---|---|---|---|---|---|---|
| | upper layer | under layer | method I | method II | | | |
| | mm. | | | | % | — | — |
| Example 15 | 3 | 2 | A | A | 0.6 | A | B |
| Example 16 | 2 | 1 | A | A | 0.87 | A | B |
| Example 17 | 2 | 1 | A | A | 0.84 | A | B |
| Example 18 | 4 | 2 | A | A | 0.74 | A | B |
| Control 4 | 2 | 1 | B | C | 1.8 | C | C |

Table 5-continued

| Control 5 | 3 | 2 | C | C | 2.9 | C | C |
|---|---|---|---|---|---|---|---|

EXAMPLE 19

The same procedure as in Example 14 was repeated except that a modified PVA obtained by hydrolyzing vinyl acetate-sodium 2-methylallylsulfonate copolymer was employed instead of the modified PVA obtained by hydrolyzing vinyl acetate-sodium allylsulfonate copolymer.

The results were similar to those in Example 14.

EXAMPLES 20 TO 25

The same procedures as in Example 14 were repeated except that various acrylic monomers as shown in Table 6 were employed instead of butyl acrylate.

The results were shown in Table 6.

tion of the modified PVA, 15 g. of n-dodecyl mercaptan as a controlling agent for molecular weight and 0.9 kg. of styrene. Then 2.1 kg. of butadiene-1,3 was introduced into the vessel through a pressure-resistant gauge, and inner temperature was elevated to 60°C. with agitation at the rate of 120 r.p.m. Further 400 g. of 5% aqueous solution of potassium persulfate was introduced into the vessel by a pressure-resistant reciprocating pump to initiate the emulsion polymerization. An inner pressure of 4.5 kg./cm.$^2$ at the beginning of the polymerization dropped with the progress of the polymerization. After 7 hours, 150 g. of 4% aqueous solution of potassium persulfate was further added and the polymerization was continued. To terminate the polymerization, hydroquinone was added to the vessel 12

Table 6

| | Monomer | | Polymer content | pH | Viscosity |
|---|---|---|---|---|---|
| | Kind | Amount g. | % | — | cps |
| Example 20 | Ethyl acrylate | 108 | 42.0 | 4.6 | 111 |
| Example 21 | Butyl acrylate | 54 | 41.2 | 5.4 | 128 |
| | Styrene | 54 | | | |
| Example 22 | Butyl acrylate | 76 | 42.1 | 3.6 | 225 |
| | 2-ethylhexyl acrylate | 32 | | | |
| Example 23 | Butyl acrylate | 76 | 40.9 | 4.2 | 57 |
| | Vinyl acetate | 32 | | | |
| Example 24 | Butyl acrylate | 54 | 41.8 | 5.8 | 58 |
| | Methyl methacrylate | 54 | | | |
| Example 25 | Butyl acrylate | 108 | 42.9 | 3.6 | 46 |
| | Acrylic acid | 5.7 | | | |

| | Dilution stability | | Miscibility with urea resin | | Water resistance of film | Storage stability at high temp. | Freeze-thaw stability |
|---|---|---|---|---|---|---|---|
| | upper layer | under layer | method I | method II | | | |
| | mm. | | — | | % | — | — |
| Example 20 | 2 | 1 | A | A | 0.9 | A | B |
| Example 21 | 2 | 1 | A | A | 0.8 | A | A |
| Example 22 | 2 | 1 | A | A | 1.1 | A | B |
| Example 23 | 2 | 2 | A | A | 1.2 | A | A |
| Example 24 | 2 | 2 | A | A | 0.8 | A | B |
| Example 25 | 2 | 1 | A | A | 1.0 | A | B |

EXAMPLE 26 AND CONTROLS 6 TO 7

A 2,000 ml. glass polymerization vessel equipped with a reflux condenser, a dropping funnel, a thermometer and a stirrer was charged with 430 parts of vinyl acetate, 215 parts of methanol, 30 parts of sodium allylsulfonate and 0.20% by mole of azobisisobutylonitrile per the vinyl acetate. After carrying out the polymerization at a temperature of 60° to 65°C. for 8 hours, the residual vinyl acetate was removed by a conventional method to give vinyl actate-sodium allylsulfonate copolymer containing 2.5% by mole of sodium allylsulfonate unit. Then the copolymer was hydrolyzed by a conventional method to give a modified PVA of which degree of hydrolysis in vinyl acetate unit was 90% by mole.

A 10 liter glass lining steel autoclave (resistant to 20 kg./cm.$^2$ in pressure and equipped with a turbine type agitator) was charged with 3.2 kg. of 4% aqueous soluhours later from the beginning of the polymerization. The inner pressure was 3.0 kg./cm.$^2$ The obtained emulsion of butadiene-1,3-styrene copolymer contained 70% by mole of butadiene unit.

As Control 6, the same procedure as in Example 26 was repeated except that a combination of sodium diisobutylnaphthalenesulfonate and sodium lauryl sulfate was employed instead of the modified PVA.

As Control 7, the same procedure as in Example 26 was further repeated except that a combination of 60 g. of PVA of which degree of hydrolysis was 90% by mole, 30 g. of nonionic surface active agent (commercially available under the trademark "Nissan Nonion P-230" made Nippon Oils and Fats Co., Ltd.) and 30 g. of anionic surface active agent (commercially available under the trademard "Nissan Trax" made by Nippon Oils and Fats Co., Ltd.) was employed instead of the modified PVA.

The results were shown in Table 7.

Table 7

| | Storage stability at high temp. | Freeze-thaw stability | Miscibility with urea resin method I | Miscibility with urea resin method II | Dilution stability upper layer mm. | Dilution stability under layer mm. |
|---|---|---|---|---|---|---|
| Example 26 | A | A | A | A | 2 | 1 |
| Control 6 | C | C | C | C | 5 | 3 |
| Control 7 | C | C | B | C | 6 | 4 |

EXAMPLES 27 TO 30

The same procedures as in Example 26 were repeated except that the modified PVA as shown in Table 8 were employed instead of the modified PVA employed in Example 26.
The results were shown in Table 8.

merization was further continued for 5 hours to give vinyl acetate-sodium ethylenesulfonate copolymer containing 2.3% by mole of sodium ethylenesulfonate unit. Then the copolymer was hydrolyzed by a conventional method to give a modified PVA of which degree of hydrolysis was 92% by mole.

With employing thus obtained modified PVA,

Table 8

| | Hydrolyzed vinyl acetate-sodium ethylenesulfonate copolymer | | | | | |
|---|---|---|---|---|---|---|
| | *methanol : monomer by weight | sodium ethylenesulfonate content % by mole | degree of hydrolysis in vinyl acetate unit % by mole | Polymer content % | pH | Viscosity cps |
| Example 27 | 5 : 95 | 1.0 | 89.5 | 42.0 | 4.0 | 2,000 |
| Example 28 | 10 : 90 | 2.0 | 88.0 | 42.1 | 5.9 | 4,620 |
| Example 29 | 25 : 75 | 2.7 | 90.2 | 42.0 | 5.9 | 3,500 |
| Example 30 | 30 : 70 | 3.5 | 89.5 | 41.8 | 4.7 | 2,950 |

*"Methanol : monomer" shows the ratio of methanol and monomer in the polymerization for preparing the modified PVA.

| | Dilution stability upper layer mm. | Dilution stability under layer mm. | Miscibility with urea resin method I | Miscibility with urea resin method II | Water resistance of film % | Storage stability at high temp. | Freeze-thaw stability |
|---|---|---|---|---|---|---|---|
| Example 27 | 3 | 2 | A | A | 0.5 | B | A |
| Example 28 | 2 | 1 | A | A | 0.7 | A | A |
| Example 29 | 2 | 1 | A | A | 0.9 | A | A |
| Example 30 | 2 | 1 | A | A | 1.1 | A | A |

EXAMPLE 31

The same vessel as in Example 1 was charged with 130 g. of methanol, 25 g. of water, 320 g. of vinyl acetate, 15 g. of 30% aqueous solution of sodium ethylenesulfonate and 2.8 g. of azobisisobutylonitrile, and polymerization was carried out at a temperature of 70°C. for 3 hours. After adding 2.8 g. of 30% aqueous solution of sodiem ethylenesulfonate to the vessel, the polymerization was further continued for 5 hours to give butadiene-1,3 and styrene were emulsion-polymerized in the same manner as in Example 26.

The results were similar to those in Example 26.

EXAMPLES 32 TO 39

The same procedures as in Example 26 were repeated except that various monomers as shown in Table 9 were employed instead of butadiene-1,3 and styrene.

Table 9

| | Monomer Kind | Amount kg. | Polymer composition molar ratio | Viscosity cps. | Dilution stability upper layer mm. | Dilution stability under layer mm. | Miscibility with urea resin method I | Miscibility with urea resin method II | Storage stability at high temp. | Freese-thaw stability |
|---|---|---|---|---|---|---|---|---|---|---|
| Example 32 | Butadiene-1,3<br>Styrene<br>Acrylic acid | 1.8<br>1.1<br>0.1 | 75.5<br>22.5<br>2.0 | 1,350 | 2 | 1 | A | A | A | A |
| Example 33 | Butadiene-1,3<br>Styrene<br>Methacrylic acid | 1.8<br>1.1<br>0.1 | 75.2<br>21.8<br>3.0 | 1,500 | 2 | 1 | A | A | A | A |
| Example 34 | Butadiene-1,3<br>Acrylonitrile | 1.8<br>1.2 | 59.0<br>41.0 | 1,000 | 3 | 1 | A | A | A | A |
| Example 35 | Butadiene-1,3<br>Acrylonitrile<br>Styrene | 1.8<br>0.6<br>0.6 | 72.9<br>9.5<br>17.6 | 1,450 | 2 | 1 | A | A | A | A |
| Example 36 | Butadiene-1,3<br>Acrylonitrile<br>Methacrylic acid | 1.8<br>1.1<br>0.1 | 57.3<br>40.2<br>2.5 | 1,200 | 2 | 1 | A | A | A | A |
| Example 37 | Butadiene-1,3<br>Methyl methacrylate | 1.8<br>1.2 | 73.0<br>27.0 | 750 | 4 | 2 | A | A | A | A |
| Example 38 | Butadiene-1,3<br>Methyl methacrylate<br>Acrylic acid | 1.8<br>1.1<br>0.1 | 71.5<br>26.0<br>2.5 | 1,550 | 2 | 1 | A | A | A | A |
| Example 39 | 2-Methylbutadiene-1,3 | 1.8 | 58.7 | 450 | 4 | 2 | B | B | B | B |

Table 9-continued

| Monomer Kind | Amount kg. | Polymer composition molar ratio | Viscosity cps. | Dilution stability upper layer / under layer mm. | Miscibility with urea resin method I / method II | Storage stability at high temp. | Freeze-thaw stability |
| --- | --- | --- | --- | --- | --- | --- | --- |
| Styrene | 1.2 | 41.3 | | | | | |

What we claim is:

1. In a process for preparing an emulsion of a polymer comprising at least one monomer unit selected from the group consisting of acrylates, methacrylates and butadiene monomers by emulsion polymerization in the presence of an emulsifier in an aqueous medium, the improvement which comprises employing as the emulsifier hydrolyzed vinyl acetate-alkali metal olefinsulfonate copolymer prepared by copolymerizing vinyl acetate and an alkali metal salt of olefinsulfonic acid selected from the group consisting of ethylenesulfonic acid, allylsulfonic acid and 2-methylallylsulfonic acid in the molar ratio of 99.5:05 to 93:7 in the absence of a solvent or in the presence of a lower alkyl alcohol solvent having 1 to 4 carbon atoms in an amount of not more than 40% by weight of the total weight of polymerization system and then hydrolyzing the resultant copolymer, said hydrolyzed vinyl acetate-alkali metal olefinusulfonate copolymer having 0.5 to 7% by mole of alkali metal olefinsulfonate unit and a degree of hydrolysis in vinyl acetate unit of at least 65% by mole.

2. The process of claim 1, wherein said hydrolyzed vinyl acetate-alkali metal olefinsulfonate copolymer is present in an amount of 0.5 to 15% by weight per the monomer employed.

3. The process of claim 1, wherein said degree of hydrolysis in vinyl acetate unit is at least 80% by mole and content of said alkali metal olefinsulfonate unit is 1 to 3% by mole.

4. An emulsion prepared by emulsion-polymerizing at least one monomer selected from the group consisting of acrylates, methacrylates and butadiene monomers in an aqueous medium in the presence of hydrolyzed vinyl acetate-alkali metal olefinsulfonate copolymer as an emulsifier in an amount of 0.5 to 15% by weight per said monomer and a catalytically effective amount of a polymerization initiator; said hydrolyzed vinyl acetate-alkali metal olefinsulfonate copolymer having 0.5 to 7% by mole of alkali metal olefin-sulfonate unit and a degree of hydrolysis in vinyl acetate unit of at least 65% by mole, which is prepared by copolymerizing vinyl acetate and an alkali metal salt of olefinsulfonic acid selected from the group consisting of ethylenesulfonic acid, allylsulfonic acid and 2-methylallylsulfonic acid in the molar ratio of 99.5 : 0.5 to 93 : 7 in the absence of a solvent or in the presence of a lower alkyl alcohol solvent having 1 to 4 carbon atoms in an amount of not more than 40% by weight of the total weight of polymerization system and then hydrolyzing the resultant copolymer to the degree of at least 65% by mole in vinyl acetate unit of said copolymer.

* * * * *